(12) United States Patent
Timmermans et al.

(10) Patent No.: US 7,121,949 B2
(45) Date of Patent: *Oct. 17, 2006

(54) DRIVE LINE APPARATUS

(75) Inventors: Joseph Timmermans, Oak Park, MI (US); Jean C. Raymond, Montreal (CA)

(73) Assignee: Altair Engineering, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/443,712

(22) Filed: May 22, 2003

(65) Prior Publication Data

US 2003/0195048 A1 Oct. 16, 2003

Related U.S. Application Data

(63) Continuation of application No. 09/814,541, filed on Mar. 22, 2001, now Pat. No. 6,602,141.

(60) Provisional application No. 60/191,162, filed on Mar. 22, 2000.

(51) Int. Cl.
*F16D 3/06* (2006.01)

(52) U.S. Cl. ........................................ 464/99; 464/162

(58) Field of Classification Search .................. 464/42, 464/99, 172, 167, 113–117, 162, 163, 91, 464/165, 183; 192/108, 107 T, 107 R; 403/359.1, 403/359.6; 180/908
See application file for complete search history.

(56) References Cited

U.S. PATENT DOCUMENTS

| | | | |
|---|---|---|---|
| 1,764,381 A * | 6/1930 | Arbuthnot | 464/167 |
| 2,710,087 A * | 6/1955 | Picard | 192/107 T X |
| 2,761,295 A | 9/1956 | Davis | |
| 3,267,696 A * | 8/1966 | Sieja | 464/113 X |
| 3,754,411 A | 8/1973 | Orain | |
| 3,813,899 A | 6/1974 | Abrahamer | |
| 4,125,000 A | 11/1978 | Grob | |
| 4,185,475 A | 1/1980 | Kleinschmidt et al. | |
| 4,308,729 A | 1/1982 | Condon | |
| 4,379,707 A | 4/1983 | Fisher | |
| 4,406,640 A * | 9/1983 | Franklin et al. | 464/91 |
| 4,548,591 A | 10/1985 | Haldric et al. | |
| 4,552,544 A | 11/1985 | Beckman et al. | |
| 4,573,946 A | 3/1986 | Brissette | |
| 4,580,996 A | 4/1986 | Brissette | |
| 4,664,642 A * | 5/1987 | Kirschey | |
| 4,669,571 A | 6/1987 | Kurde | |
| 4,819,755 A | 4/1989 | Smemo et al. | |
| 4,991,992 A | 2/1991 | Gutfleisch | |
| 5,188,195 A | 2/1993 | Haustein | |
| 5,286,232 A | 2/1994 | Engle | |
| 5,360,377 A | 11/1994 | Fernandez | |
| 5,624,318 A | 4/1997 | Jacob et al. | |
| 5,628,688 A | 5/1997 | Eversole et al. | |

(Continued)

FOREIGN PATENT DOCUMENTS

NO      23434      *  6/1913  ................. 464/167

(Continued)

*Primary Examiner*—Greg Binda
(74) *Attorney, Agent, or Firm*—Young & Basile, P.C.

(57) ABSTRACT

A drive line apparatus has a pair of tubular shafts configured to fit telescopically. The outer shaft has internal splines and the inner shaft has outer splines so that the shafts rotate in unison. Each of the outer and inner shaft has one partially closed end for coupling to a universal joint, wherein the joint connected to the partially closed end of the inner shaft is disposed within the inner shaft for further reducing the length of the drive line apparatus.

16 Claims, 3 Drawing Sheets

U.S. PATENT DOCUMENTS

| | | |
|---|---|---|
| 5,716,276 A | 2/1998 | Mangas et al. |
| 5,772,520 A | 6/1998 | Nicholas et al. |
| 5,836,823 A | 11/1998 | Shellaberger |
| 6,508,714 B1 * | 1/2003 | Zilberman et al. ............ 464/91 |
| 6,602,141 B1 * | 8/2003 | Timmermans et al. ........ 464/99 |

FOREIGN PATENT DOCUMENTS

| | | | |
|---|---|---|---|
| SE | 129 620 | * 10/1950 | .................. 464/91 |

* cited by examiner

US 7,121,949 B2

DRIVE LINE APPARATUS

This application is a continuation of U.S. patent application Ser. No. 09/814,541 filed Mar. 22, 2001, which issued as U.S. Pat. No. 6,602,141 on Aug. 5, 2003, and which claims the benefit of U.S. Provisional Application No. 60/191,162 filed Mar. 22, 2000.

FIELD OF THE INVENTION

The invention relates to a drive line apparatus for use where there is limited space between a driving member and a driven member.

BACKGROUND OF THE INVENTION

The drive line shaft connects the transmission output to the differential at the rear wheel on rear drive vehicles. The rotary motion of the transmission output shaft is carried to the differential and from there to the wheel. The drive line shaft must change in length and angle as the wheels move up and down. To allow for these two variations, two or more universal joints and a slip joint are required. The universal joint accommodates a change in the drive angle. The slip joint accommodates a change in the length of the drive line.

In the conventional drive line shaft, the slip joint has outside splines on one shaft and matching internal splines on a mating hollow shaft. The splines cause the two shafts to rotate together and to permit the two to move endwise in relation to each other. This allows changes in the length of the propeller shaft as the rear axles move toward or away from the vehicle frame.

Some vehicles, such as busses, have the engine mounted at the rear. Due to the limited space available, short shafts and universal joints carry the engine power to the rear wheels. It would be desirable to provide the shortest transmission shaft possible without sacrificing the strength of the shaft to support bearing stresses.

SUMMARY OF THE INVENTION

In one aspect of the invention, a drive line apparatus is provided for connection between an output portion of a driving member and an input portion of a driven member wherein the output portion and input portion are each connectible to a universal joint, and the drive line apparatus includes an outer hollow shaft connectible to a universal joint and an inner hollow shaft connectible to another universal joint wherein the outer and inner hollow shafts are telescopically connected so that at least a portion of the inner hollow shaft is disposed within the outer shaft and at least a portion of the universal joint connectible to the inner shaft is disposable within the inner hollow shaft to minimize the total length of the drive line apparatus.

In another aspect of the invention, a drive line apparatus is provided for connection between an output portion of the driving member and an input portion on the driven member wherein the drive line apparatus includes an outer hollow shaft having at least one open end and an inner hollow shaft having at least one open end. The drive line apparatus further includes means for rotating the inner hollow shaft in unison with the outer hollow shaft. The drive line apparatus further includes means for connecting either the inner or outer hollow shaft to the output portion of the driving member and means for connecting the other of the inner or outer hollow shaft to the input portion of the driven member, wherein at least a portion of the connection means to the inner hollow shaft is disposed within the inner hollow member.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
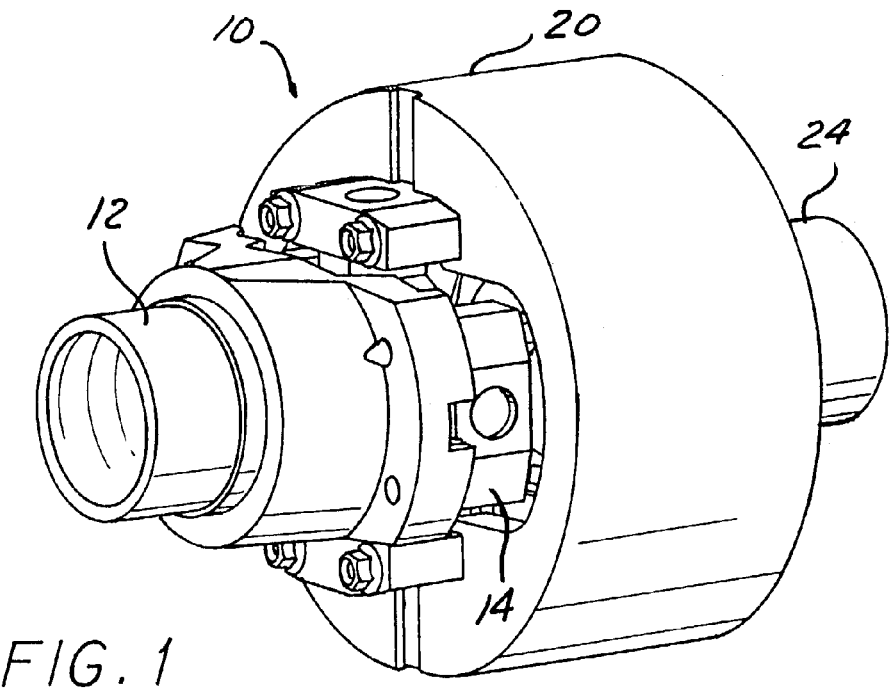
FIG. 1 is a perspective view of a shaft coupling incorporating the present invention.

Referring now to FIGS. 1–4, the drive line shaft 10 of the present invention includes a first yoke support 12, a first and second universal joint 14, 16, a second yoke support 24 and an improved shaft coupling 18 including an outer shaft member 20 and an inner shaft member 22. These components of the drive line apparatus 10 are all interconnected such that the distance between a driving member and a driven member, such as a transmission and differential or axle assembly, is maintained to a minimum.

The first and second yoke supports 12, 24, and the first and second universal joints 14, 16 are conventional devices currently used in the industry. Although many configurations are available for these devices, the Figures show just one example of devices rigidly connected to the output shaft of a driving unit, such as an engine or transmission and devices rigidly connected to the input shaft of a driven unit, such as a generator, transmission, or transfer box.

The shaft coupling 18 includes an outer shaft member 20 and an inner shaft member 22. Each of the outer and inner shaft members 20, 22 respectively, have a hollow interior and at least one open end. The outer shaft member 20 has an interior dimension for receiving at least a portion of the inner shaft member therein so that the outer and inner shaft members are telescopically connected and can have a common longitudinally extending rotational axis. The inner shaft member 22 has an interior dimension for receiving at least a portion of one of the universal joints 14, 16 therein. The dimensions of the outer and inner shaft members 20, 22 respectively are further dependent on the load and axial movement required for the application. In general, the outer and inner shaft members 20, 22, respectively, have a larger inner radius or areas than conventional drive line shafts.

Figure 2:
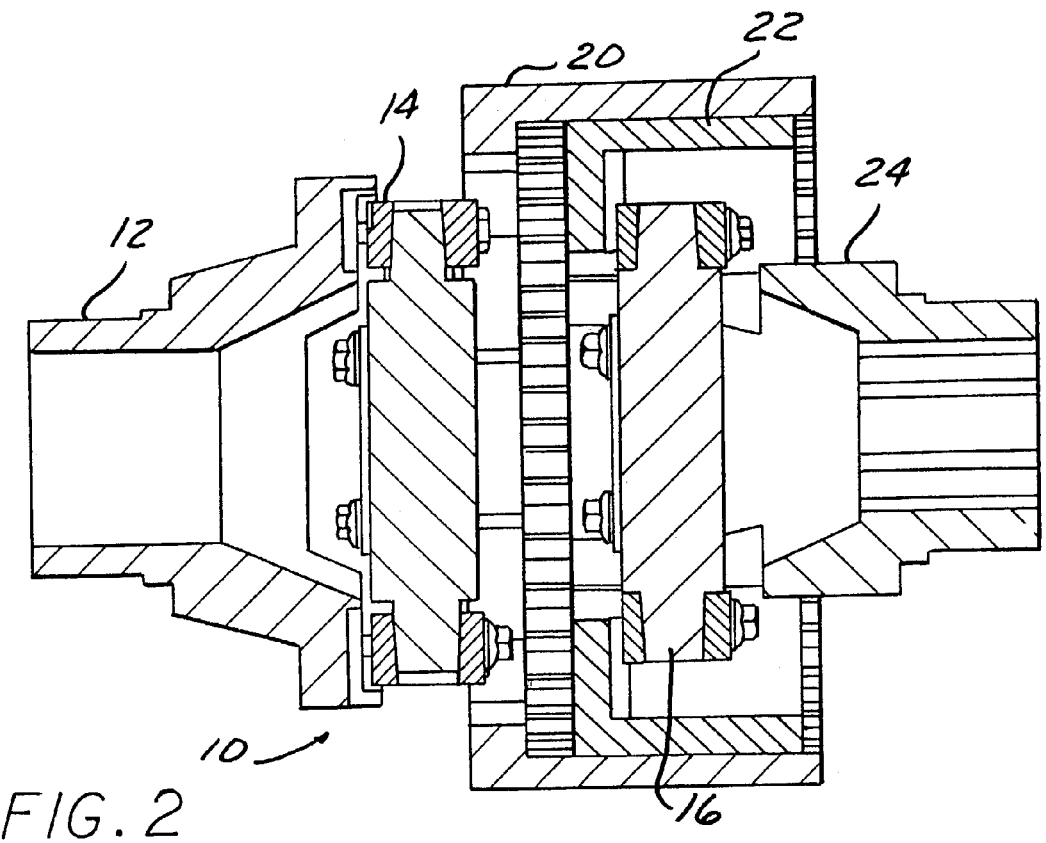
FIG. 2 is a cross sectional view of the shaft coupling in FIG. 1 showing an outer shaft member and inner shaft member of the shaft coupling.
Figure 3:
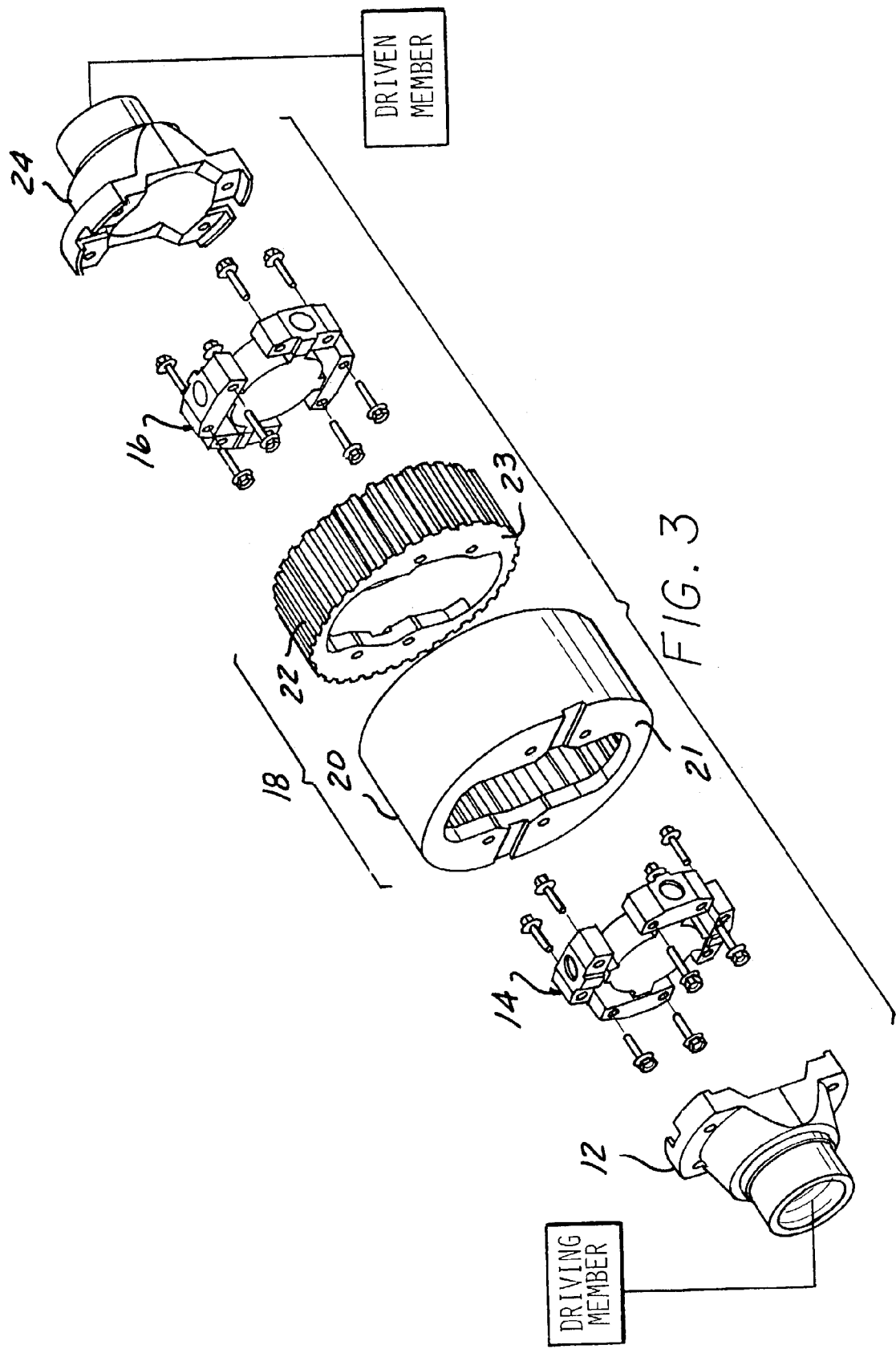
FIG. 3 is an exploded view of the shaft coupling showing the outer shaft member connected to a driving member and the inner shaft member connected to a driven member.

Each of the outer and inner shaft members 20, 22 respectively have means for rigid connection to one of the universal joints 14, 16. The means for rigid connection to one of the universal joints is positioned on each of the outer and inner shaft members 20, 22 to minimize the space between the first and second universal joints 14, 16 while allowing for relative axial movement between the outer and inner shaft members. FIG. 3 shows one example of means for rigid connection wherein each of the outer and inner shaft members 20, 22 have one flanged end. The flanged ends 21 and 23 of the outer and inner shaft members 20, 22 respectfully provide a surface area and mounting apertures for connection to the corresponding universal joint 14 and 16. To minimize the space between the first and second universal joints 14 and 16, the flanged ends 21 and 23 are oriented in the same direction for both outer and inner shaft members 20 and 22. In other words, the outer surfaces of the flanged ends 21, 23 of the outer shaft member 20 and inner shaft member 22, respectively, are oriented in the same longitudinal direction such that the outer surfaces of flanged ends 21, 23 are both facing either the driving member or driven member as best seen in FIG. 3. As shown in FIG. 2, this results in flange ends 21, 23 being positioned adjacent the same longitudinal end of the assembled shafts 20, 22. The open ends of outer and inner shafts 20, 22 are likewise positioned adjacent an opposite end of the assembled shafts 22, 22.

The first universal joint 14 is provided for connection to the first yoke support 12 and adjacent components. The first universal joint 14 connects the outer shaft member 20 to the driving member (FIG. 3) or to the driven member (FIG. 4) via the first yoke support 12.

The second universal joint 16 can have the same configuration as the first universal joint 14. The second universal joint 16 connects the inner shaft member 22 to the driven member (FIG. 3) or to the driving member (FIG. 4) via the second yoke support 24. The yoke and universal joints shown in the Figures are only one example. Other configurations of coupling joints are known in the art.

Figure 4:
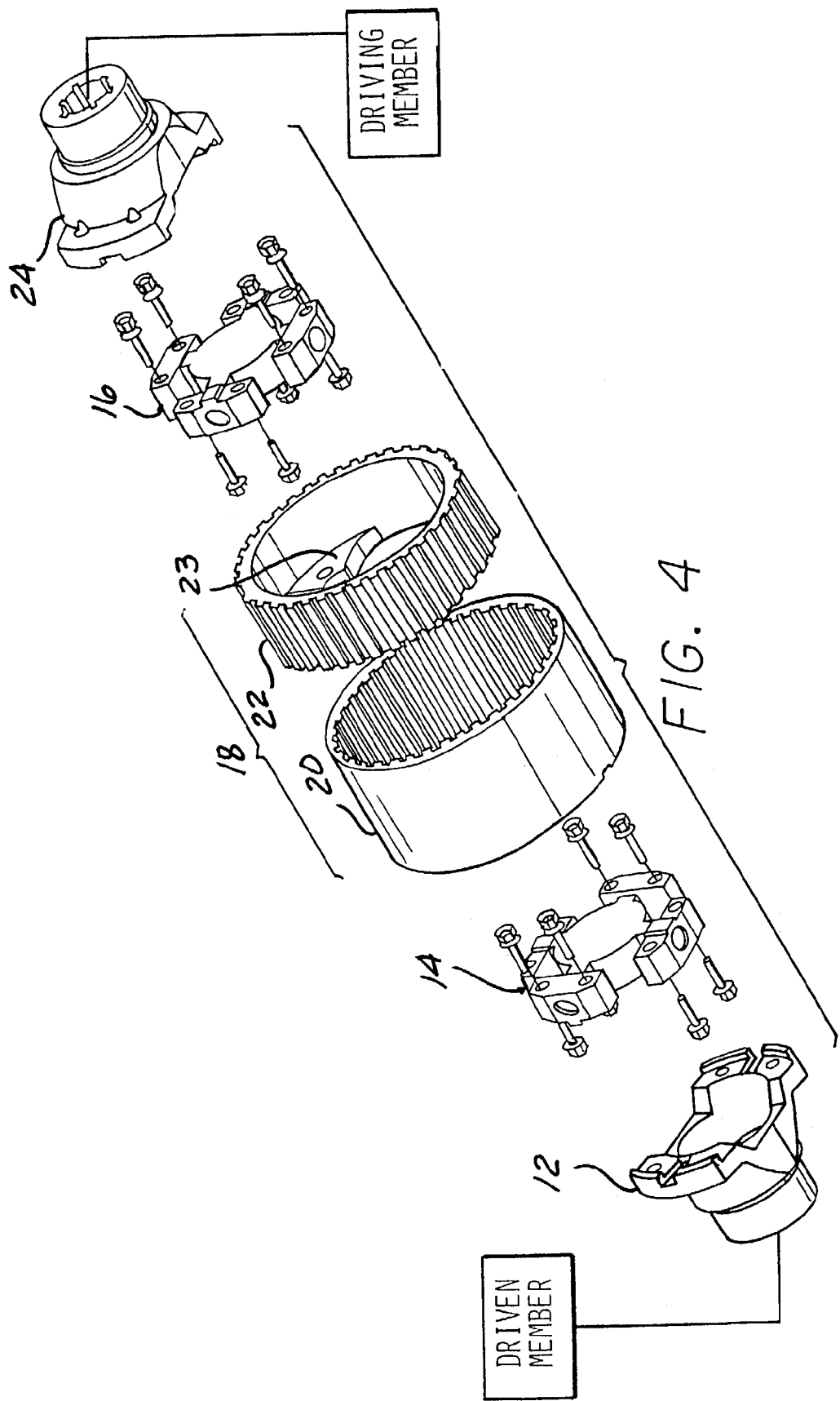
FIG. 4 is an exploded view of the shaft coupling reversed showing the inner shaft member connected to the driving member and the outer shaft member connected to the driven member.

In the illustrated embodiment, simultaneous rotation of the inner and outer shaft members is provided by splined surfaces. As seen in FIGS. 3 and 4 the inner peripheral wall of the outer shaft member 20 is splined, and an outer peripheral surface of the inner shaft member 22 is splined. The inner shaft member has an overall diameter slightly greater than the inner diameter of the outer shaft member 20 so that the outer splined peripheral surface of the inner shaft member 22 can be received within the inner diameter of the outer shaft member 20, while the splined surface of the outer shaft member 20 matingly mesh with the splined surface of the inner shaft member 22. As a result, the inner shaft member 22 rotates in unison with the outer shaft member 20.

The splined inner surface of the outer shaft member 20 and the splined outer surface of the inner shaft member 22 causes the two shaft members to rotate together and also permits the two shafts 20, 22 to move axially or endwise in relation to each other. This configuration allows changes in the length of the shaft as the rear axles move toward or away from the vehicle frame, as used in one application. The shaft coupling 18 replaces the tubular slip shafts of the prior art and allows the pair of universal joints 14, 16 to be positioned closer to each other by having the connection to second universal joint 16 of inner shaft member 22 moved toward the connection to the first universal joint 14 of the outer shaft member 20. This invention provides an advantage over the tubular slip joints of the prior art in that at least a portion of the universal joints can be encompassed within the shaft coupling 18 to minimize space required for the drive line. As seen in FIG. 2, the configuration of the preferred embodiment provides universal joint 16 to be positioned entirely within the inner shaft member 22.

Although the shaft coupling 18 has been described and shown as a cylindrical and splined device, it is apparent that other configurations are available for the shaft coupling 18. For example, the outer and inner hollow members forming the shaft coupling can be other geometric configurations. The shaft may be any three, four, or other multi-sided shaft. The inner and outer hollow members forming the shaft will have complementary surfaces causing the inner and outer hollow members to rotate in unison.

Further, the connectors of the shaft coupling to the output of the driving member and to the input of the driven member can vary from the illustrated embodiment. Other types of universal joints, such as a simple universal joint or a two-yoke-and-spider universal joint, are conventional. The inner and outer hollow shaft members 22, 20 can also include portions of the universal joint integral with the shaft members 22, 20 for connection directly to the yokes 12, 24.

Other applications of the present invention will become apparent to those skilled in the art when the following description of the best mode contemplated for practicing the invention is read in conjunction with the accompanying drawings.

What is claimed is:

1. A drive line apparatus for connection between an output portion of a driving member and an input portion of a driven member, the drive line apparatus comprising:

a first hollow shaft having an elongated slot extending longitudinally along an inner surface of the first hollow shaft; and a second hollow shaft assembled with respect to the first hollow shaft, the second hollow shaft having an elongated rib extending radially outward from an outer surface of the second hollow shaft, a longitudinal axis of the rib being aligned substantially parallel with a longitudinal axis of the second hollow shaft, wherein at least a portion of one of the hollow shafts is telescopically sheathed within the other hollow shaft, such that the rib of the second hollow shaft slidably engages the slot of the first hollow shaft, wherein the first hollow shaft includes a first radially inwardly extending flange and the second hollow shaft includes a second radially inwardly extending flange, the first and second hollow shafts assembled in coaxial relationship with respect to one another with the first and second radially inwardly extending flanges adjacent a cannon longitudinal end of the assembled hollow shafts.

2. The drive line apparatus of claim 1 further comprising a first universal joint connected to the first hollow shaft adjacent one longitudinal end of the first hollow shaft, wherein the first universal joint is connected to the flanged end portion of the first hollow shaft.

3. The drive line apparatus of claim 1 further comprising a second universal joint connected to the second hollow shaft adjacent one longitudinal end of the second hollow shaft, wherein the second universal joint is connected to the flanged end portion of the second shaft.

4. A drive line apparatus for connection between an output portion of a driving member and an input portion of a driven member, the drive line apparatus comprising:

a first hollow shaft having an elongated slot extending longitudinally along an inner surface of the first hollow shaft; and a second hollow shaft assembled with respect to the first hollow shaft, the second hollow shaft having an elongated rib extending radially outward from an outer surface of the second hollow shaft, a longitudinal axis of the rib being aligned substantially parallel with a longitudinal axis of the second hollow shaft, wherein at least a portion of one of the hollow shafts is telescopically sheathed within the other hollow shaft, such that the rib of the second hollow shaft slidably engages the slot of the first hollow shaft, the first hollow shaft including a flanged end portion extending radially inward and the second hollow shaft having a flanged portion extending radially inward and positioned within the first hollow shaft.

5. The drive line apparatus of claim 4 further comprising a first and second universal joint wherein one of the first and second universal joints is connectible to the flanged portion of the second hollow shaft and is positioned within the second hollow shaft.

6. A drive line apparatus for connection between an output portion of a driving member and an input portion of a driven member, the drive line apparatus comprising:
- a first hollow shaft having an open first end;
- a second hollow shaft assembled to be telescopically positioned coaxially within the first hollow shaft, the second hollow shaft having an open first end, the open ends of each of the first and second hollow shafts being adjacent a common longitudinal end of the assembled hollow shafts;
- single means for providing longitudinally extending line contact between the first hollow shaft and the second hollow shaft while transferring rotation from one hollow shaft of the assembled hollow shafts to another hollow shaft, such that the two hollow shafts rotate in unison, while simultaneously allowing for longitudinal shifting of the first hollow shaft relative to the second hollow shaft, the single transferring and shifting means extending along substantially an entire longitudinal length of the telescoping portion of the first and second hollow shafts and disposed between an outer periphery of the second hollow shaft and an inner periphery of the first hollow shaft; and
- means for connecting one side of the assembled hollow shafts opposite the open ends of the first and second hollow shafts to the output portion of the driving member and an opposite side of the assembled hollow shafts opposite the open ends of the first and second hollow shafts to the input portion of the driven member, wherein at least a portion of the connecting means is positioned within the assembled telescoping shafts, the second hollow shaft having a second end with a flanged portion extending radially inward.

7. The drive line apparatus of claim 6, wherein the connecting means further comprises at least one universal joint connectible to one of the first and second assembled hollow shafts.

8. The drive line apparatus of claim 7, wherein one of the at least one universal joint is positioned within the second hollow shaft.

9. The drive line apparatus of claim 6, wherein the first hollow shaft includes a flanged end portion extending radially inward.

10. The drive line apparatus of claim 9, wherein the connecting means further comprises a universal joint connectible to the flanged end portion of the first hollow shaft.

11. The drive line apparatus of claim 6, wherein the connecting means further comprises a universal joint connectible to the flanged end portion of the second shaft.

12. The drive line apparatus of claim 6 further comprising:
- the first hollow shaft having a second end with a flanged portion extending radially inward.

13. The drive line apparatus of claim 6 further comprising:
- at least one universal joint connectible to the flanged portion extending radially inward into the second end of the second hollow shaft.

14. The drive line apparatus of claim 6, wherein the single transferring and shifting means comprises a positive interference drive interconnection.

15. The drive line apparatus of claim 6, wherein the single transferring and shifting means comprises at least one longitudinally extending spline.

16. A drive line apparatus for connection between an output portion of a driving member and an input portion of a driven member, the drive line apparatus comprising:
- a first hollow shaft having an open first end;
- a second hollow shaft assembled to be telescopically positioned coaxially within the first hollow shaft, the second hollow shaft having an open first end, the open ends of each of the first and second hollow shafts being adjacent a common longitudinal end of the assembled hollow shafts;
- single means for providing longitudinally extending line contact between the first hollow shaft and the second hollow shaft while transferring rotation from one hollow shaft of the assembled hollow shafts to another hollow shaft, such that the two hollow shafts rotate in unison, while simultaneously allowing for longitudinal shifting of the first hollow shaft relative to the second hollow shaft the single transferring and shifting means extending along substantially an entire longitudinal length of the telescoping portion of the first and second hollow shafts and disposed between an outer periphery of the second hollow shaft and an inner periphery of the first hollow shaft;
- means for connecting one side of the assembled hollow shafts opposite the open ends of the first and second hollow shafts to the output portion of the driving member and an opposite side of the assembled hollow shafts opposite the open ends of the first and second hollow shafts to the input portion of the driven member, wherein at least a portion of the connecting means is positioned within the assembled telescoping shafts; and
- the first hollow shaft having a first radially inwardly extending flange and the second hollow shaft having a second radially inwardly extending flange, the first and second hollow shafts assembled in coaxial relationship with respect to one another with the first and second radially inwardly extending flanges adjacent the same longitudinal end of the assembled hollow shafts.

* * * * *